April 24, 1956     M. R. KONDOLF     2,742,834
TRAFFIC CAMERA

Filed Nov. 9, 1950     7 Sheets-Sheet 1

INVENTOR.
Mathias R. Kondolf

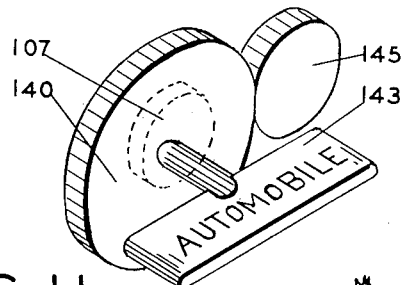
FIG. 11
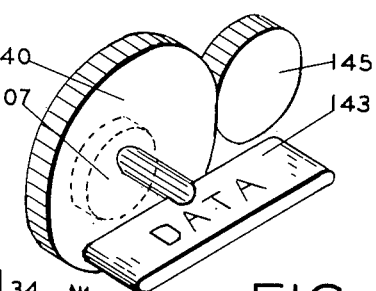
FIG. 12
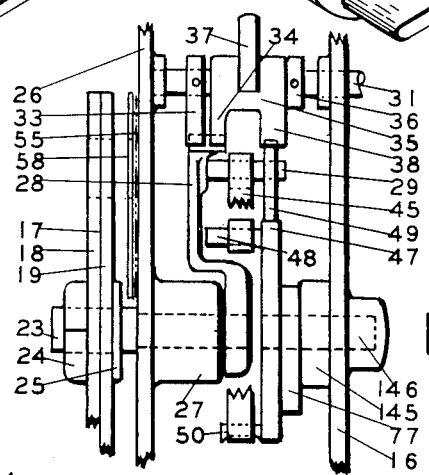
FIG. 6
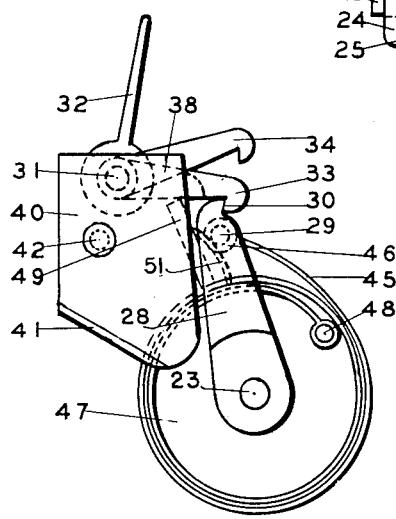
FIG. 7
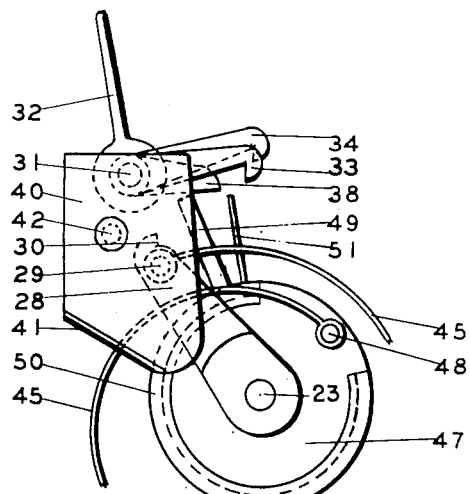
FIG. 8
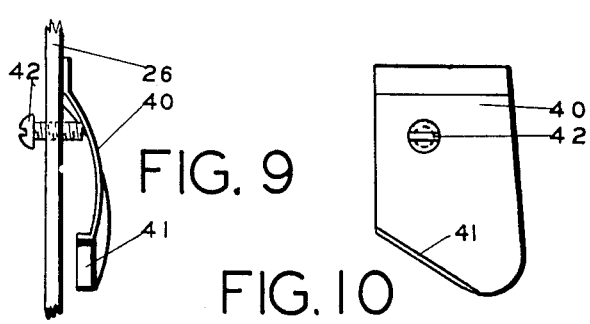
FIG. 9
FIG. 10
INVENTOR.
Mathias R. Kondolf April 24, 1956 M. R. KONDOLF 2,742,834
TRAFFIC CAMERA
Filed Nov. 9, 1950 7 Sheets-Sheet 3

INVENTOR.
Mathias R. Kondolf

April 24, 1956    M. R. KONDOLF    2,742,834
TRAFFIC CAMERA

Filed Nov. 9, 1950    7 Sheets-Sheet 4

*INVENTOR.*
*Mathias R. Kondolf*

April 24, 1956   M. R. KONDOLF   2,742,834
TRAFFIC CAMERA
Filed Nov. 9, 1950   7 Sheets-Sheet 5
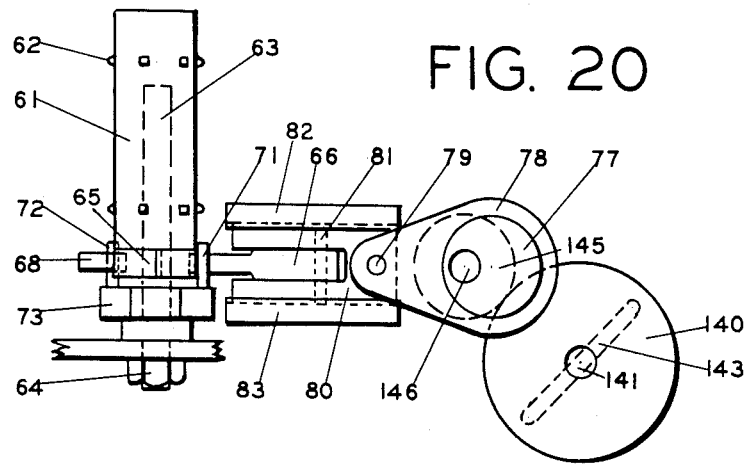
FIG. 20
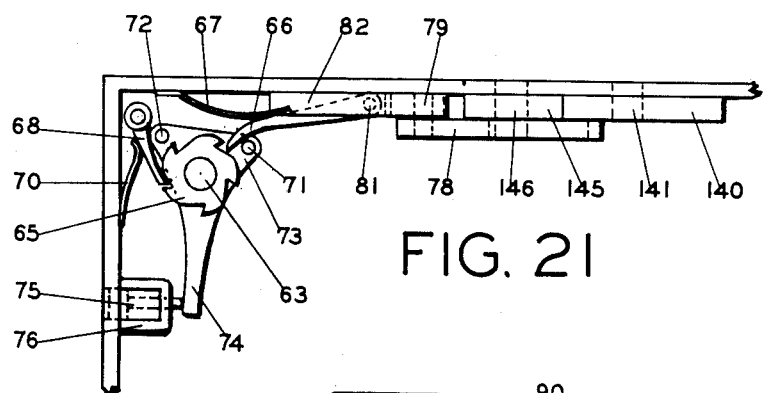
FIG. 21
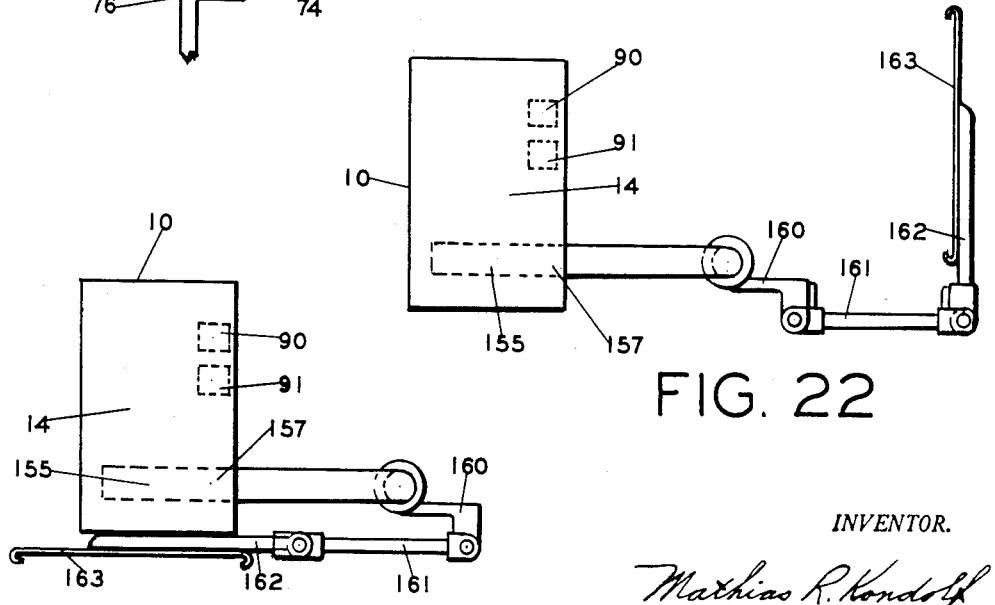
FIG. 22
FIG. 23
INVENTOR.
*Mathias R. Kondolf*

April 24, 1956 M. R. KONDOLF 2,742,834
TRAFFIC CAMERA

Filed Nov. 9, 1950 7 Sheets-Sheet 6

INVENTOR.
Mathias R Kondolf

INVENTOR.
Mathias R. Kondolf

United States Patent Office 2,742,834
Patented Apr. 24, 1956

2,742,834

TRAFFIC CAMERA

Mathias R. Kondolf, Webster, N. Y., assignor, by mesne assignments, to Traffic Controls, Inc. of Delaware, Rochester, N. Y., a corporation of Delaware Application November 9, 1950, Serial No. 194,775

8 Claims. (Cl. 95—11)

This invention relates to an improved camera for use in traffic control and specifically to determine the speed of an automobile. The invention embodies a number of features to assure good usable photographs even when the camera is operated by a person unfamiliar with ordinary photographic processes and picture taking.

The camera is adapted to take two pictures of an automobile at a known time interval between the pictures. The two pictures in combination show the distance moved by the automobile. The factors of distance moved and the time interval between the pictures determine the speed of the automobile.

The operation of the invention is as follows:

A standard cartridge of 35 mm. film is placed in the camera and the film inserted under a pressure plate having apertures in alignment with the two lenses used. The film then passes around a film winding cylinder and is pushed into a film reservoir which is provided with spring means to control the winding of the coil of film in the reservoir. Upon release of the film cylinder ratchet pawls the film can be wound back into its original cartridge.

After the two pictures of the automobile are taken, the key of the camera is given a half revolution and this automatically resets the shutter spring and transports the film by rotating the film cylinder the proper amount. By means of mechanism described hereinafter, the camera lenses are automatically moved forward away from the film so that they are in focus for objects approximtely 6" in front of the lenses. By means of a suitable extensible frame a data card showing the car license number and other desired information is held in front of the camera at the 6" distance and two pictures of the data card are photographed on the film immediately adjacent to the two pictures of the automobile.

The camera key is now given a further half revolution and this automaticaly transports the film, sets the shutter spring and moves the lenses back into focus for photographing another automobile. While pictures of an automobile are being taken the data card holder is folded back and this causes the data card holder to rest against the camera so that notations can easily be made on the card.

As an alternative means to adapt the camera to take close up pictures of the data cards, a pair of auxiliary lenses can be positioned in front of the camera lenses, which in this embodiment of the invention, will remain stationary. The mechanism described herein is also adapted to move such auxiliary lenses in and out of position without change in function. The front focus of the lens is changed in either case.

An object of this invention is to provide a traffic control camera adapted to carry out a cycle of operations comprising (a) the taking of an initial picture of an automobile followed by (b) the automatic taking of a second picture of the same automobile and (c) a change in the optical characteristic of the lenses used, or a change in the position of the lenses relative to the film to enable the photographic recording of information on a data card held in proximity to the camera.

An object of the invention is to provide a camera which will take an initial picture when the shutter is released and after a fixed time interval will automatically take a second picture.

An object of the invention is to provide shutter means which can be adjusted with precision to a standard time interval between the pictures, and which will uniformly maintain this standard time interval. This will enable each shutter in a group of cameras to operate at a standard uniform time interval.

An object of the invention is to provide a camera shutter combination which enables the shutter to be reset without the use of auxiliary devices to protect the film from exposure during the resetting operation.

An object of the invention is to provide a camera shutter combination with interlocks to prevent improper winding of the shutter spring and thus cause variation in the time interval between the pictures.

An object of this invention is to provide a rotary shutter for a camera with peripheral air vanes to modulate the speed of rotation.

An object of the invention is to provide means to bring the shutter spring to a uniform position after each winding.

An object of the invention is to provide a camera which by successive partial turns of a master key will set the shutter, transport the film and change the photographic characteristics of the optical equipment to enable either distant or near focus pictures to be taken as required by the cycle of operations.

An object of the invention is to provide a three point support for lens positioning to enable independent focusing of the lenses.

An object of the invention is to provide a folding support for a data card adapted to position the card for notations thereon and for photographing the card.

An object of the invention is to provide, in a camera having a high speed rotary shutter, brake means to absorb the shock of stopping the shutter.

An object of the invention is to provide a brake shoe for a rotary shutter with improved means to increase the braking action at a predetermined point.

An object of the invention is to provide a film pressure plate which will also serve as a frame mask to control the size of the pictures to be photographed.

An object of the invention is to provide a telescopic light trap encircling the lenses, which will permit movement of the lenses while providing against entry of light into the camera case except through the lenses.

An object of the invention is to provide an improved sight for use in operating a camera for the specified purposes.

An object of the invention is to provide means to vary the amount of light passing through the lenses and directly connect said means to an integral exposure meter.

An object of the invention is to provide a weight rotating with the shutter and radially adjustable to vary the speed of rotation obtainable with a given shutter spring.

An object of the invention is to provide a camera to produce a composite picture by making two exposures through a single lens at a fixed time interval apart.

An object of the invention is to provide an accelerator spring to increase the turning force acting on the shutter when it starts to rotate.

An object of the invention is to provide control spools to define the position of the lenses in the camera for distant and near pictures.

The characteristic features and advantages of the invention will more fully appear in the following description and the accompanying drawings.

In the drawings in which like reference numerals designate like parts

Fig. 6 is a top plan diagrammatic view showing the arrangement of the shutter and details of the parts used to control the shutter.

Figs. 7 and 8 are diagrammatic views showing details of the shutter control and brake means.

Fig. 9 is a side view and Fig. 10 is a plan view of the braking means for the shutter.

Figs. 11 and 12 are diagrammatic perspective views showing the position of the camera key and the lens positioning cam at each phase of the cycle of operation used in the camera.

Figs. 20 and 21 are views showing the film winding cylinder and the means of actuating same for automatic transport of the film.

Fig. 22 is a top view of the camera with a detachable frame which is used to support the data card in position for photographing same on the film.

Fig. 23 is a view of the camera with the data card holder folded back against the camera to enable notations to be made on the card while same is in the holder.

Figure 1:
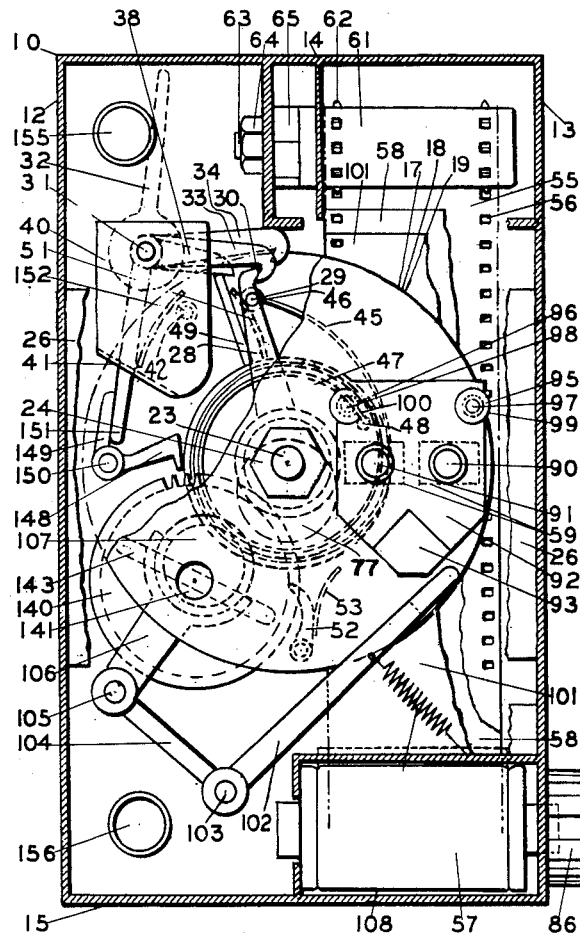
Fig. 1 is a front fragmentary view of the camera with the front side removed to show the general arrangement of parts.
Figure 2:
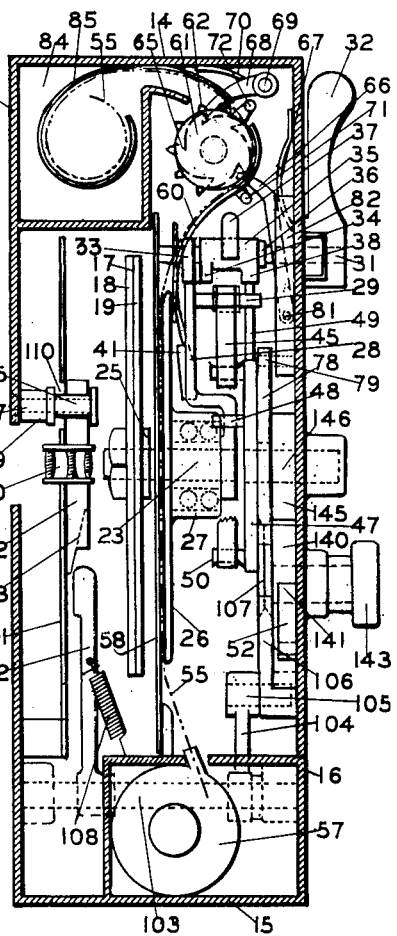
Fig. 2 is a side fragmentary view of the camera with the side removed to show the general arrangement of parts.
Figure 13:
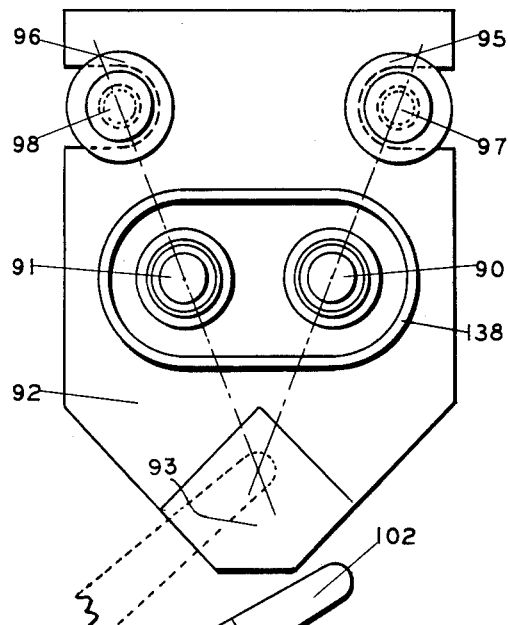
Fig. 13 is an enlarged view of the lens plate with its actuating arm.

Referring to Figs. 1 and 2 reference numeral 10 designates the frame or case of the camera of which 11 is the front plate or member, 12 is the left side and 13 the right side member. 14 is the top member, 15 the bottom member and 16 the back member. The side 13 is removable to permit the loading of film. The sensitized film 55 is taken from the standard film cartridge 57 and passes in back of the shutter 17 to a film winding cylinder 61 which is provided with teeth 62 to engage with the perforations 56 of the film. Two discs 18 and 19 form the shutter 17 between the film 55 and the two lenses used in the camera.

The outer lens, being the one farthest from the center of the shutter is designated 90 and the inner lens 91. These lenses are mounted in a lens plate 92 which is fixed to a spring plate or mount 101. The movement of the lens plate 92 and of the lenses is governed by the control spools 95 and 96.

The primary gear 140 is fixed on the shaft 141 which passes through the back plate 16 and the bearing housing 142 to terminate in a camera winding key 143. Fixed to the inner end of the shaft 141 is the cam 107 which as hereinafter described operates the mechanism used for lens positioning. Meshed with the primary gear 140 is the secondary gear 145. The primary gear 140 is twice as large as the secondary gear 145 and therefore a half revolution of the gear 140 will rotate the gear 145 a full revolution. The gear 145 is fixed on the shaft 146 which is journalled in the bearing housing 147. Fixed to the shaft 146 is an eccentric 77 which operates the film transporting means. Also fixed to the shaft 146 is the winding plate 47 for the shutter spring 45.

As shown in Figs. 1 and 2 a pawl 52 is held by the spring 53 to engage the teeth of the gear 140. This pawl prevents turning of the gear 140 except in the direction to wind the shutter spring 45.

Referring to Figs. 2, 6, 7 and 8 the shutter supporting plate 26 is provided with a housing 27 in which are mounted anti-friction bearings to support the shaft 23. The rear shutter disc 19 is fixed to the shutter shaft flange 25 by screws. After adjustment for angular position of the shutter apertures as described below the front shutter disc 18 is locked against the disc 19 by means of the nut 24. If desired, after adjustment of the discs to bring the time interval between the pictures to the desired standard, the discs may be locked by through rivets or other fastening means.

Fixed on the end of the shaft 23 is a shutter arm 28 which is engaged by the shutter release arm 33 and the safety catch 34. The pin 29 is fixed to the shutter arm 28 and has rotatably mounted thereon the bearing 46 to which is attached the outer end of the shutter spring 45.

The spring 45 is preferably a flat type similar in section to that used in large watches. Other types of springs, including a torsion spring, may also be used.

The shutter arm pin 29 is engaged by the post 49 which projects from the rim of the winding plate 47. The post 49 acts as a stop for movement of the shutter arm 28 and the shutter 17 and also serves to move the shutter arm 28 from frictional engagement with the brake shoe 40 when the winding plate 47 is rotated in winding the shutter spring 45.

Mounted on the winding plate 47 is the pin 48 which engages the inner end of the shutter spring 45. Upon rotation of the winding plate the spring 45 is wound from within the coil, the outer end of the spring 45 being held stationary by the pin 29 which in turn is held by the shutter arm 28 and the shutter release arm 33. Plate 47 is provided with a rim, preferably grooved, as shown at 50, around which the spring 45 is wound. This rim causes the spring 45 to conform to the same position each time it is wound. This is important to secure uniform action of the spring.

As shown in Figs. 1 and 7 the accelerator spring 51 is mounted to project from the rim of the winding plate 47. The spring 51 applies pressure against the shutter pin 29 at the completion of the spring winding movement. This places the spring 51 under flexure so that upon release of the shutter arm by the straightening of the spring 51. This serves to give an accelerated start to the shutter.

Referring to Figs. 6, 7 and 8 it will be noted that the shutter arm 28 is provided with a lip 30 which engages the shutter release arm 33. The face of this lip 30 is made wider than necessary to engage the arm 33 so that the lip can also be engaged by the safety catch 34. The catch 34 is attached to a rotatable block 35 which is mounted between the shutter release arm 33 and a collar 36 on the shutter release shaft 31. By means of the spring 37 the catch 34 is held in position to engage the shutter arm lip 30 if same were rotated. Fixed to the block 35 is the arm 38 which is lifted by the winding post plate 49 immediately prior to the completion of the winding operation. Lifting the arm 38 rotates the block 35 and moves the catch 34 out of the path of the lip 30, thus clearing the way for the shutter arm 28 to rotate when the shutter release 33 is operated. The catch 34 serves as a safety interlock and prevents the release of the shutter until the shutter spring has been fully wound.

Referring to Figs. 1, 2, 8, 9 and 10 a brake shoe 40 is provided to engage with the shutter arm 28 to slow down or stop the shutter near the end of its rotation. An adjusting screw 42 affords means of varying the pressure of the brake against the shutter arm 28. The shutter rotates at comparatively high speed and it is important to avoid an excessive shock to the winding plate post 49 and the resultant jar to the shutter mechanism were the brake not provided.

The shutter parts before and after release are respectively shown in Figs. 7 and 8. In Fig. 8 the shutter arm 28 is frictionally held by the brake shoe 40.

The brake shoe 40 has a flange 41 which is normally held apart from the shutter plate 26. When the shutter arm 28 first engages the brake shoe 40 the same acts as a cantilever beam exerting a light pressure on the arm 28. As the arm 28 moves across the face of the brake shoe the flange 41 is brought into contact with the shutter plate 26 and further movement of the shutter arm is resisted by increased pressure of the brake shoe, which now acts as a beam supported at two ends. This modulation of the braking pressure enables the shutter to be stopped with a nicely controlled action to avoid jar to the mechanism.

From the above description it will be evident that both the shutter and the winding plate rotate in the same direction. The shutter arm pin 29 being positioned in front of the accelerator spring 51 and post 49 while the shutter is set and the shutter arm pin 29 being in back of the winding plate post 49 after each release of the shutter. Winding of the shutter spring serving to move post 49 from the front to the back of the pin 29.

Figure 3:
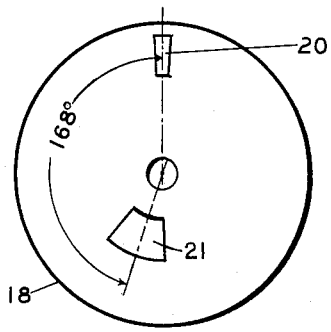
Figs. 3 and 4 show the pair of discs which are used in combination in the shutter.
Figure 4:
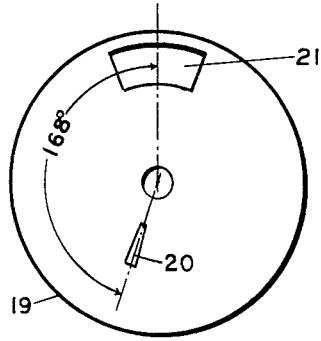
Figure 5:
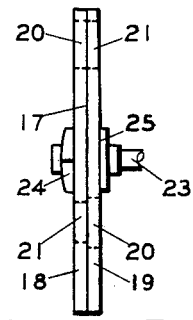
Fig. 5 is a side view of the shutter showing the discs in position on the shutter shaft to form the complete shutter.

Figs. 3 and 4 show the manner in which the shutter interval is adjusted and also serve as an example of such adjustment. The front disc 18 is provided with the narrow aperture 29 which passes over the outer lens 90 to make the exposure. The rear disc 19 is provided with the narrow aperture 20 to make the exposure through the inner lens 91. Each disc also has a wide clearance aperture 21 which matches the narrow aperture in the other disc. Rotation of the discs on each other will change the angular position of the narrow apertures and therefore will change the time interval between the pictures taken through the shutter.

As an alternative or additional means to adjust the time interval between the pictures the total shutter weight may be changed. An adjustable weight moved outwardly towards the rim of the shutter will slow down the shutter speed.

Tests with a certain spring show that if the shutter apertures are set so that the radial lines passing through the center of the apertures are at an angle of 168 degrees, the interval between pictures will be .0540 second. Dividing .054 second by 168 gives .000321 second for each degree of shutter rotation between the pictures. If it is desired that the time interval be set at .0567 second, it is merely necessary to change the relative position of the shutter discs an angular distance corresponding to the difference between the two intervals, or in the example given this would amount to 8.4 degrees.

The relative position of the shutter discs can be readily adjusted with an accuracy of less than ¼ degree. This corresponds to a time interval of less than 1/10,000 of a second. The precision of this adjustment is pointed out as an important feature of the invention.

It is important that the interval between the pictures taken by any one of a group of cameras be alike and remain uniform. The construction described permits precise adjustment of the interval to a desired standard. It has been found that the shutter specified herein, having no connection with the camera except the bearing mount for the shaft and the operating spring connection at the end of the shutter arm, maintains a uniform time interval with very small tolerance.

Figs. 11 and 12 show in diagrammatic views the position of the camera key 143 and of the cam 107 during each of the two phases of the camera cycle. It will be noted that the primary or large gear 140 has made a half revolution, between the position shown in Fig. 11 when the lenses are set to take the automobile pictures, and the position shown in Fig. 12 when the lenses are set to take pictures of the data card. Suitable marking of the key provides the operator with definite information whether an automobile or a data card is to be photographed.

Figs. 1, 2, 13 and 14 show the means provided for the adjustment of the lens plate to secure the proper position of the lenses in each phase of the camera cycle.

Figure 14:
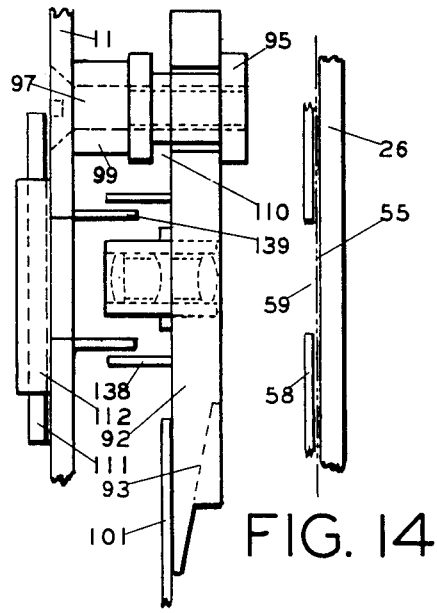
Fig. 14 is a diagrammatic plan view showing the lens plate and the lens control spools.

The lens control spools 95 and 96 have an excess of space between their end flanges, as shown at 110, over the space necessary to accommodate the lens plate 92. As shown in Fig. 14 the lens plate 92 contacts the rear flange of the lens control spools 95 and 96. When the lens plate 92 is moved forward it will contact and be limited in its movement by the front flange of the control spools. In the forward position of the lenses the space 110 will be between the lens plate and the rear flange of the spools. The spring plate 101 is cut away so that it does not interfere with the action of the control spools. The amount of the space 110 governs the movement of the lenses necessary to place them respectively in position to take distant pictures of automobiles or close up pictures of the data cards.

In the embodiment shown the control spools 95 and 96 are internally threaded and spaced from the front member 11 of the camera by the spacers 99 and 100. They are held in fixed position by the screws 97 and 98. It will be evident that a variation in thickness of the spacers will vary the position of the control spools and of the lenses in relation to the film 55. This provides a means to focus the lenses.

It will be noted that each lens is positioned in a straight line between a central spool and the point of contact between the lens plate 92 and the actuating arm 102. Since the lens plate 92 is held by a spring plate 101, this 3-point suspension provides for individual adjustment of the lenses by the control spools.

The lower end of the lens plate 92 is inclined as shown at 93. This slant surface 93 is engaged by the end of an actuating arm 102 which moves upwardly on to the surface 93 to force the lens plate 92 forward into the position necessary for taking photographs of the data cards.

Fig. 14 shows the shutter plate 26 against which the film 55 is held by the film pressure plate 58. Two apertures, designated 59 in Fig. 14, are made in the pressure plate 58. These openings are each the size of the picture to be taken and this enables the film pressure plate 58 to also serve as a mask over the film and limit the size of the pictures photographed thereon.

Figure 15:
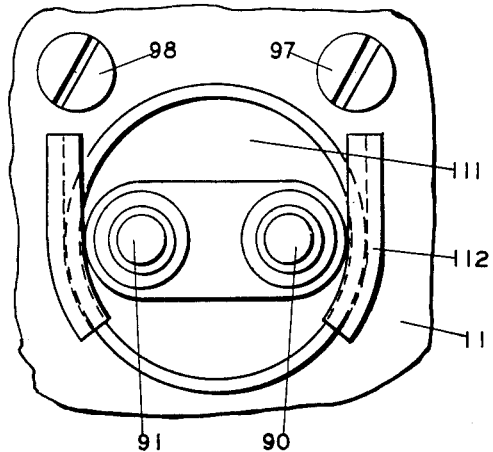
Fig. 15 is an enlarged view of the front of the camera showing the housing in which individual interchangeable filters may be placed to govern the amount of light passing through the lenses.

The short focus lenses used eliminate for the purposes of this invention the need of reduced stop openings in the lenses to increase the depth of focus. However, to control the amount of light which passes through the lenses a changeable light filter 111 is provided in the embodiment shown in Fig. 15. The filter 111 is held in front of the lenses in a suitable mount 112. The filters may be of different types but are preferably of the light intensity type which permits all light waves to pass into the lenses and only controls the overall intensity of the light. Filters cutting the amount of light by two, four, eight or more times can be interchanged in the mount 112 to adapt the camera for pictures in bright sunlight, shade and under poor light conditions.

Figure 18:
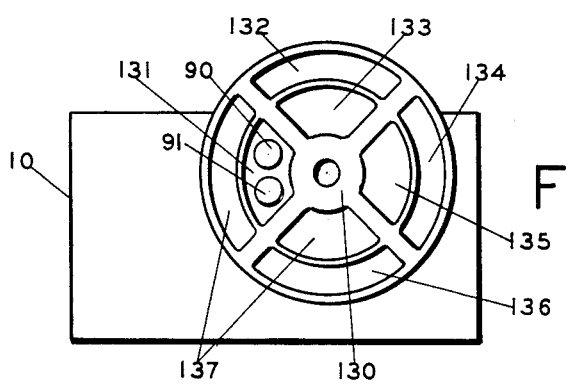
Fig. 18 is a front view showing means to combine light intensity filters with an integral exposure meter.

Fig. 18 shows means to combine the various filters with a means to visually determine the proper filter to use under various light conditions. In this embodiment of the invention, filters of varying degree of light transmission are placed in a rotatable mount shown at 130. This mount extends beyond the side of the camera and in this projected area are mounted visual filters which correspond respectively with the particular filters in front of the lenses. As shown, for a particular lens filter 131 the visual filter is 132. For filter 133 the visual filter is 134 and for filter 135 the visual filter is 136. Clear openings with no filters are provided as at 137 for use under very poor light conditions.

In use the operator looks through the visual filters, one at a time, at the background of the pictures to be taken, and rotates the mount 130 until the background appears to be under a standard illumination in the manner used in certain types of exposure meters. The proper filter for the light condition prevailing will then be in place before the lenses.

Instead of the visual filters to be used as described to determine light conditions, the rim of the mount 130 may be marked "Brilliant Sun," "Hazy Sun," "Cloudy or shade," and "Dull," and the mount turned to bring the corresponding lens filter in place. Due to the latitude of the film this arrangement gives satisfactory results in most instances.

Since it is necessary that all light be excluded from the camera except that which enters through the lenses, a light trap is provided as shown in Fig. 14. This trap comprises the tube 138 attached to the lens plate 92. This tube closely surrounds the tube 139 which is attached to the front 10 of the camera. The tube 139 telescopes within the tube 138 and thus accommodates for movement of the lens plate 92.

Figure 19:
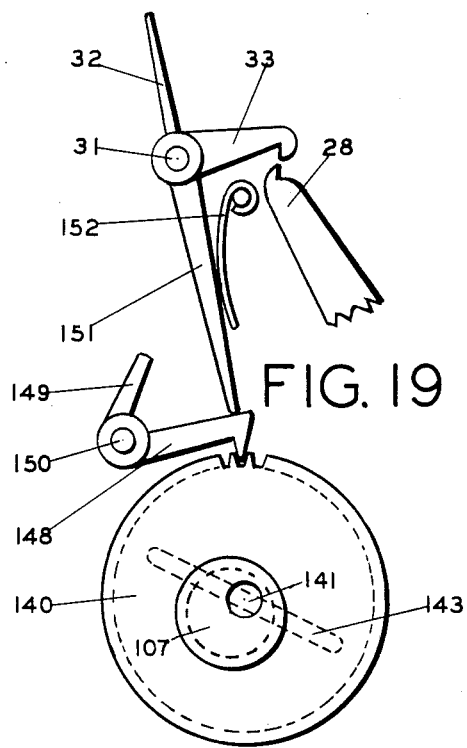
Fig. 19 is a diagrammatic view of the interlock which operates in connection with the shutter release mechanism to prevent winding or unwinding shutter spring except while the shutter arm is engaged with the manual release arm.

As shown in Figs. 1 and 19 a lock is provided which prevents the rotation of the gear 140 while the shutter release arm 33 is disengaged from the shutter arm 28. This interlock comprises a pawl 148 which is forced into engagement with the teeth of the gear 140 by an arm 151 fixed to the shutter release shaft 31. When the shutter release arm 33 is engaged with the shutter arm 28 the arm 151 contacts the arm 149 which is fixed to the pawl 148 and thereby rotates the pawl 148 about its mount 150. This lifts the pawl 148 out of engagement with the teeth of the gear 140. This interlock prevents improper manipulation of the camera key 143 to vary the shutter spring action by locking the gear 140 and the key 143 when the release arm 33 is lifted. A spring 152 holds the arm 151 in contact with the pawl arm 149 until the shutter release handle 32 is operated.

Figs. 1 and 2 show the means provided to actuate the arm 102 and change the position of the lenses for respectively taking pictures of an automobile and pictures of a data card. The arm 102 is fixed to the shaft 103 which extends across the camera and is held in suitable bearings at each end. Fixed to this shaft 103 is the arm 104 which in turn is operated through a pin 105 by the cam shoe 106. This cam shoe engages the cam 107 which is fixed to and rotates with the primary gear 140. The arm 102 is pulled away from the plate 92 and off of the slant surface 93 by the tension spring 108 which also serves to hold the cam shoe 106 in contact with the cam 107 at all times.

Figure 16:
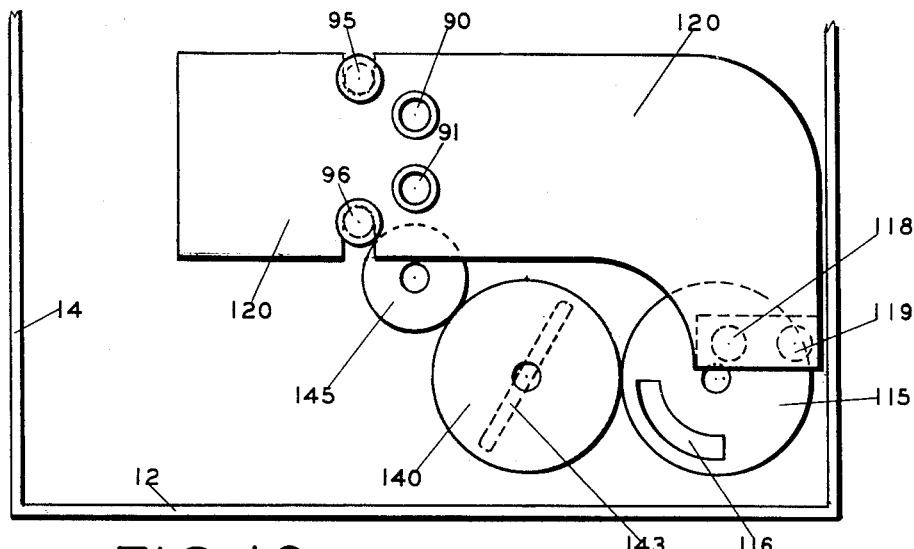
Fig. 16 is a front view and Fig. 17 is a top plan view showing an alternative means to position the lens plate for each phase of the camera cycle.
Figure 17:
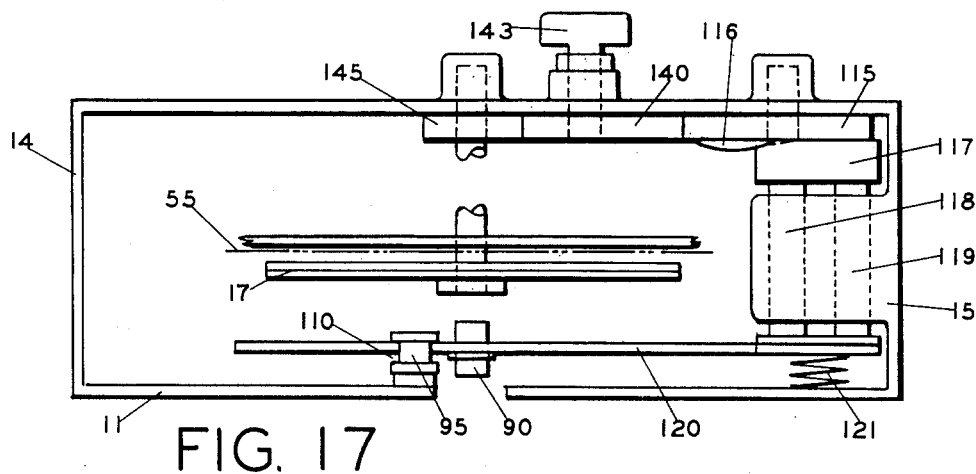

Figs. 16 and 17 show an alternative means to move the lenses. In this embodiment of the invention a third gear 115 of the same size as the gear 140 is mounted to mesh therewith. A cam 116 is fixed to the face of the gear 115. The block 117, rods 118 and 119 and lens plate 120 are all rigidly connected. The push rods 118 and 119 slide in the camera frame in suitable slide bearings.

A half turn of the camera key 143 rotates the gears 140 and 115 and causes the cam 116 to engage the block 117. This moves the lens plate 120 forward against the pressure of the spring 121 and positions the lenses 90 and 91 to focus on a data card. The next half turn of the key 143 moves the cam 116 out of engagement with the block 117 and the lens plate 120 is forced back by the spring 121. The movement of the lens plate 120 is controlled by the throw of the cam 116 and the control spools 95 and 96 which are described above.

Referring to Figs. 1, 2, 20 and 21 a film winding cylinder 61 is provided with the film engaging teeth 62. This cylinder rotates freely on the shaft 63. Fixed to the cylinder 61 is the ratchet 65 which is rotated by the pawl 66. The pawl 66 is held in the slide 80 by the pin 81. Slide 80 is guided in its motion by the slideways 82 and 83. Fixed in the slide 80 is the pin 79 which engages with the eccentric strap 78. The strap 78 is reciprocated by the eccentric 77 which is fixed to the secondary gear 145. The gear 145 makes a complete revolution each time the primary gear 140 is given a half turn by the camera key 143. A pawl 68 is held against the ratchet 65 by the spring 70 and normally prevents reverse rotation of the ratchet and the attached film cylinder 61.

Rotating on the shaft 63 is a yoke 73 provided with pins 71 and 72. A tube 76 forms a bearing for plunger 75 which makes contact with the yoke arm 74.

The film 55 is drawn from the film cartridge and passes in front of the shutter plate 26 and under the pressure plate 58. It is guided around film cylinder 61 by means of the spring guide 60 and is forced into the film storage compartment 84. This compartment is provided with the expanding spring member 85 which guides the film and causes it to coil upon itself as it is fed into the storage compartment by the film winding cylinder.

A half revolution of the camera key 143 results in a full revolution of the gear 145 and eccentric 77. This causes the slide 80 and the pawl 66 to move upward and return and rotates the film cylinder 61 the proper amount to transport an unexposed section of film in back of the apertures 59 in the film pressure plate 58.

After the entire cartridge load of film has been exposed, or at any other time desired, the plunger 75 may be depressed from outside the camera. This will cause the yoke 73 to rotate and engage the pin 71 with the pawl 66 and the pin 72 with the pawl 68, moving both of these pawls out of engagement with the ratchet 65. This will permit the film to be wound back into the film cartridge 57 by means of the rewind knob 86 and its attached slotted shaft which engage the spool in the film cartridge.

Figure 24:
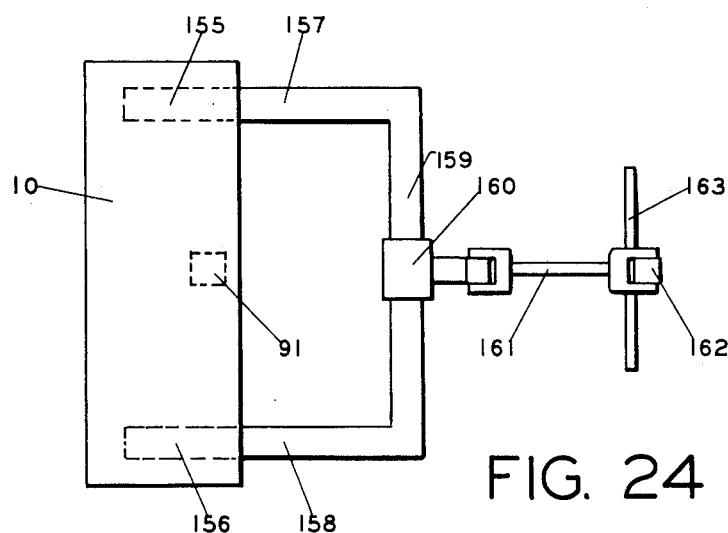
Fig. 24 is a side view of the camera and data card frame in position as shown in Fig. 22.

The camera frame is provided with the tubular wells 155 and 156 as shown in Fig. 1. These wells accommodate the detachable data card frame as shown in Figs. 22, 23 and 24. In use the frame is connected to the camera by inserting its tubular ends 157 and 158 into the camera wells. The front section 159 of the data frame has fixed thereon a lug 160. Connected to the lug 160 is the link 161 and connected to the link 161 is the link 162 to which is attached the data card holder 163. As shown in Fig. 22, the links 161 and 162 are folded forwardly to place the data card holder 163 into position for photographing the data card held therein. It will be noted that the links 161 and 162 are provided with yoke ends and shoulders which control the position of the links in order to place the data card holder in proper position. The links 161 and 162 are folded back to place the data card holder 163 in the position shown in Fig. 23. It will be noted that when in this position the card holder will permit notations to be readily made on the data card, the camera case serving as a support for the card holder and for the operator's hand.

Figure 25:
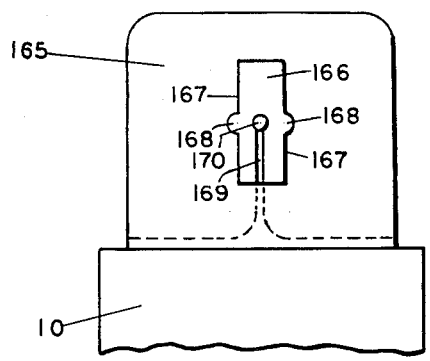
Fig. 25 is a rear view of the camera showing sighting means.
Figure 26:
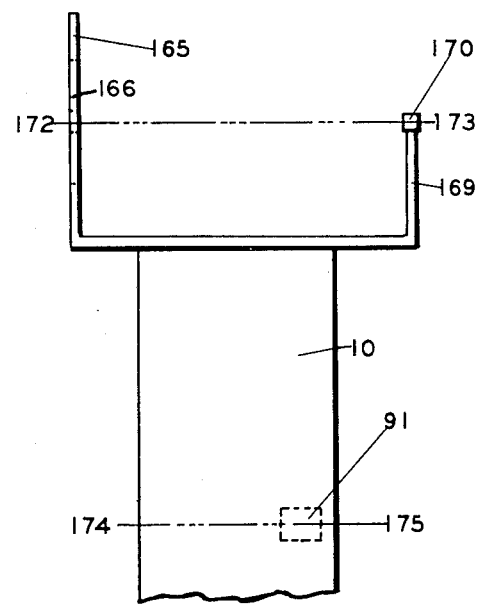
Fig. 26 is a side view of the camera showing sighting means.

Figs. 25 and 26 show means to sight the camera. It will be understood that any type of sighting device, including optical sights may be used but for the purpose of this invention the sight described embodies an improvement over well known designs. The improved sight blocks out most of the background from the operator's view in order to more readily determine the exact instant for shutter release.

As shown the sight comprises a back plate 165 having a relatively narrow aperture 166. The vertical sides 167 of the aperture are notched at 168 to designate the center of the aperture which is in alignment with the first sight as shown by the line 172 and 173 in Fig. 26.

The front sight consists of a post 169 having a small disc 170 at the top. The line 172 to 173 is parallel with the axis of the camera lens as shown by the line 174 to 175.

The operator holds the camera a few inches in front of one eye so he can sight through the relatively narrow aperture and center the forward sight in the aperture. When the disc 170 appears in line with the notches 168, the camera is in vertical alignment and by centering the disc 170 and post 169 in the aperture 166 horizontal alignment is obtained. This places the operator's eye in line with the center line of the sights and any object seen in this line will be centered in the pictures.

The camera is pointed at the roadway and centered on a definite object in the background, such as a telegraph pole. The sides of the aperture assist the operator in holding the camera in a vertical position. The camera is held stationary and when an automobile appears in the aperture the camera operator waits until about one-third of the automobile is seen. (This is roughly when the automobile's windshield appears at the side of the aperture.) The shutter is then released.

It has been found that this sight and the method of use described secures pictures with the automobile well centered and in front of a background object which can be used as a base point for measurements on the combined pictures. This provision for proper sighting of the camera when taking pictures of cars travelling at high speed is an important feature of the camera.

If preferred, small projections ca be used at opposite sides of the aperture instead of the notches to show the vertical center. Such projections should be limited in size to avoid any obstruction to an open view through the aperture.

Figure 27:
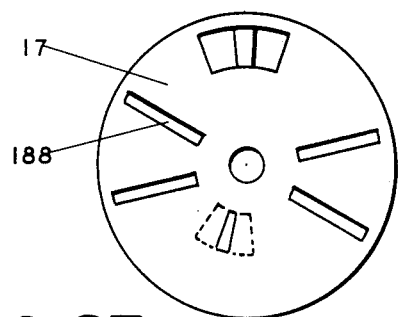
Fig. 27 is a view of a rotary shutter provided with air vanes to reduce the speed of rotation.

In Fig. 27 is shown a shutter disc 17 provided with integral vanes 188. These vanes set up air currents when the shutter is revolved and therefore modify the speed of rotation of the shutter. The result obtained by using the vanes 188 is the same as that obtained by the use of a somewhat weaker shutter spring. If desired, the vanes 188 may project past the peripheral edge of the shutter.

Figure 28:
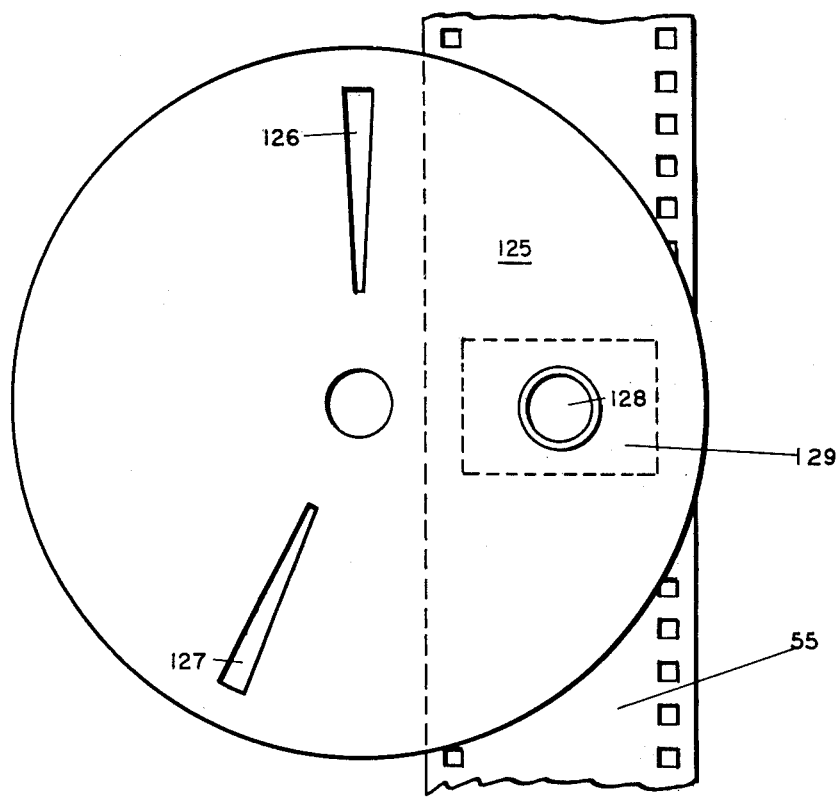
Fig. 28 is a diagrammatic view showing a shutter for use in an alternative embodiment of the invention.

In Fig. 28 is shown the shutter used in an alternative embodiment of the invention. In this modification the shutter 125 is provided with two apertures 126 and 127 each of which pass, when the shutter is given a full revolution, between the single lens 128 and the film 55. The apertures 126 and 127 are made of less width than the previously described apertures in order to reduce the exposure time. The other parts and arrangements of the camera are as hereinbefore specified.

The construction shown in Fig. 28 gives two images of a moving automobile, partly superimposed in one composite picture, shown at 129, which is obtained by a double exposure of the film. There is a great probability of confusion and poor delineation of the automobile in this composite picture but it is possible, in many cases, to determine the distance moved by the automobile from the picture.

It will be understood that a series of changeable Waterhouse stops may be used with the lenses of the camera as an equivalent of the light intensity filters described above. The filters have the advantage of not requiring the careful fitting and centering necessary with diaphragm stops. If the lenses are sufficiently spaced apart the usual iris diaphragm may be used.

I claim:
1. A traffic camera arranged to accomplish two phases of a cycle and comprising a primary gear manually rotated by a camera key in half turns to cause the camera mechanism to conform to the phases of the camera cycle; a second gear of half the diameter of said primary gear in mesh with said primary gear; film transport means an eccentric fixed to said secondary gear to reciprocate said film transport means; a shutter spring; means coupled to said second gear to wind said spring; a third gear of the diameter of said primary gear in mesh with said primary gear; a cam fixed to said third gear; a lens plate carrying push rods having a cam shoe on the ends thereof reciprocated by said cam upon rotation of said third gear; two lenses fixed in said lens plate and moved relative to the film exposure plane upon rotation of said camera key; control spools to limit the motion of said lens plate and lens; a shutter with spaced apertures to expose a portion of a film frame through one lens for a first picture and after a fixed time interval to expose another portion of the film frame through the other lens; a shutter arm fixed to said shutter; means intercoupling said shutter spring with said shutter arm to turn said arm and rotate said shutter; release means for said shutter; brake means to stop the rotation of said shutter; and extensible means to hold a data card in position for photographing the same.

2. A traffic camera arranged to accomplish two phases of a camera cycle and comprising a primary gear manually rotated by a camera key in half turns to cause the camera mechanism to conform to the phase of the camera cycle; a second gear of half the diameter of said primary gear in mesh with said primary gear; film transport means; an eccentric fixed to said secondary gear to reciprocate said film transport means; a shutter spring; means fixed to said second gear to wind said spring; a cam fixed to said primary gear; a cam shoe reciprocated by said cam; a rocking shaft; an arm to transmit motion from said cam shoe to said rocking shaft; a pressure arm fixed to said shaft; a lens plate provided with a surface engaged by said pressure arm; two lenses fixed in said lens plate and moved relative to said film by said pressure arm; control spools to limit the motion of said lens plate and lens; a shutter with spaced apertures to expose a portion of a film frame through one lens for a first picture and after a fixed time interval to expose another portion of the film frame through the other lens; a shutter arm fixed to said shutter with said shutter spring arranged to turn said arm and rotate said shutter; release means for said shutter; brake means to stop the rotation of said shutter; and extensible means to hold a data card in position for photographing the same.

3. A traffic camera for successively taking a group of distance focus photographic exposures of vehicles, on a film strip and near focus exposures of indicia bearing cards, comprising lens means, lens supporting means shiftably supporting said lens means for movement to distant and near focus positions relative to the film exposure plane of said camera, shutter means for making a plurality of exposures of a vehicle during one cycle of operation of said shutter, film-advancing means, conditioning means for tensioning said shutter for a subsequent operating cycle and actuating said film-advancing means on operation thereof, and means mechanically intercoupling said conditioning means with said lens-supporting means to shift said lens means alternately to said distant and near focus positions on successive operation of said conditioning means.

4. A traffic camera for successively taking a group of photographic exposures on a film strip separated by a preselected time interval of a moving vehicle and making a photographic record on the same film strip of an indicia bearing card comprising lens means for producing successive spaced photographic images of the vehicle on the film strip, a plate disposed perpendicular to the optical axis of said camera for supporting said lens means, means slidably supporting said plate for movement parallel to said optical axis to position said lens means at distant and near focus positions relative to the film exposure plane of said camera, shutter means for making said group of exposures of a vehicle during one cycle of operation of said shutter, film advancing means, conditioning means for tensioning said shutter for a subsequent operating cycle and actuating said film advancing means on operation thereof, and means intercoupling said conditioning means with said plate to shift said lens means alternately to said distant and near focus positions on successive operation of said conditioning means.

5. A traffic camera for successively taking a pair of distant focus time related photographic exposures of a moving vehicle and near focus exposures of indicia bearing cards comprising a pair of lenses for producing side-by-side images transversely of a film strip in the film exposure plane of said camera, a plate disposed perpendicularly to the camera optical axis for supporting said lenses, supporting means shiftably supporting said plate and lenses for movement to distant and near focus positions relative to the film exposure plane, a rotary shutter having radially and angularly spaced apertures to be successively aligned individually with said lenses during a single cycle of operation of said shutter, film advancing means, driving means intercoupled with said shutter and said film advancing means to tension said shutter and advance the film one picture frame on each actuation of said driving means, and means intercoupling said driving means with said lens supporting plate and actuated upon each operation of said driving means to shift said lens supporting plate to alternately dispose said lenses at distant and near focus positions on successive operations thereof for making near focus exposures of indicia bearing cards in alternate picture frames on said film strip adjacent their associated distant focus exposure.

6. A traffic camera for successively taking a pair of distant focus time related photographic exposures of a moving vehicle and near focus exposures of indicia bearing cards comprising a pair of lenses for producing side-by-side images transversely of a film strip in the film exposure plane of said camera, a plate disposed perpendicularly to the camera optical axis for supporting said lenses, supporting means shiftably supporting said plate and lenses for movement to distant and near focus positions relative to the film exposure plane, a rotary shutter having radially and angularly spaced apertures to be successively aligned individually with said lenses during a single cycle of operation of said shutter, film advancing means, driving means intercoupled with said shutter and said film advancing means to tension said shutter and advance the film one picture frame on each actuation of said driving means, cam means driven by said driving means, a cam shoe rigidly carried by said lens plate, means resiliently biasing said lens plate and cam shoe toward said cam and toward a position disposing said lenses at one of said focus positions, said cam shoe and lens plate being reciprocated by said cam on actuation of said cam by said driving means to position said lens plate and lenses against the bias of said resilient means to the other of said focus positions on alternate operations of said driving means, and a folding frame on said camera having means for holding an indicia bearing card in position to be photographed by said lenses when the same are in said near focus position.

7. A traffic camera for successively taking a pair of distant focus time related photographic exposures of a moving vehicle and near focus exposures of indicia bearing cards comprising a pair of lenses for producing side-by-side images transversely of a film strip in the film exposure plane of said camera, a plate disposed perpendicularly to the camera optical axis for supporting said lenses, supporting means shiftably supporting said plate and lenses for movement to distant and near focus positions relative to the film exposure plane, a rotary shutter having radially and angularly spaced apertures to be successively aligned individually with said lenses during a single cycle of operation of said shutter, film advancing means, driving means intercoupled with said shutter and said film advancing means to tension said shutter and advance the film one picture frame on each actuation of said driving means, eccentric means driven by said driving means, an inclined surface on said lens plate, a rocking shaft reciprocated by said eccentric means and having an integral arm to engage said inclined surface and cam said lens plate to position said lenses at one of said focus positions on reciprocation of said arm into contact therewith, resilient means biasing said lens plate toward the other of said focus positions, said arm being shifted into contact with the inclined surface of said plate by said eccentric means on alternate actuation of said driving means, and a folding frame on said camera having means for holding an indicia bearing card in position to be photographed by said lenses when the same are in said near focus position.

8. A traffic camera for successively taking a group of photographic exposures on a film strip separated by a preselected time interval of a moving vehicle and making a photographic record on the same film strip of an indicia-bearing card, comprising lens means for producing successive spaced photographic images of the vehicle on the film strip, a supporting member for said lens means including a portion disposed perpendicular to the optical axis of said camera having a bearing surface thereon, means slidably supporting said supporting member for movement parallel to said optical axis between positions disposing said lens means at distant and near focus positions relative to the film exposure plane of said camera, film-advancing means, manually shiftable conditioning means manually actuated to advance said film strip and condition said camera for a successive exposure cycle for each exposure cycle of the camera, means driven by said conditioning means for operatively engaging said bearing surface of said lens-supporting member upon alternate actuations of said conditioning means for an exposure cycle for shifting said lens means to one of said distant and near focus positions, and means operative upon disengagement of said lens-shifting means with said bearing surface to shift said lens-supporting member to the other of said distant and near focus positions.

References Cited in the file of this patent

UNITED STATES PATENTS

| | | |
|---|---|---|
| 942,132 | Comstock | Dec. 7, 1909 |
| 1,084,137 | Dolby | Jan. 13, 1914 |
| 1,136,105 | Comstock | Apr. 20, 1915 |
| 1,488,027 | Runcie | Mar. 25, 1924 |
| 1,678,493 | Albada | July 24, 1928 |
| 1,762,378 | Avers | June 10, 1930 |
| 1,917,330 | Riddell | July 11, 1933 |
| 1,995,252 | Keinert et al. | Mar. 19, 1935 |
| 2,114,024 | Kondolf | Apr. 12, 1938 |
| 2,257,424 | Meyer | Sept. 30, 1941 |
| 2,278,505 | Zapp | Apr. 7, 1942 |
| 2,305,301 | Maniya | Dec. 15, 1942 |
| 2,336,278 | Mihalyi | Dec. 7, 1943 |
| 2,420,339 | Rabinow | May 13, 1947 |
| 2,475,956 | Gillon | July 12, 1949 |
| 2,476,576 | Bachelder | July 19, 1949 |
| 2,531,376 | Langdon | Nov. 21, 1950 |
| 2,535,591 | Mosman | Dec. 26, 1950 |

FOREIGN PATENTS

| | | |
|---|---|---|
| 578,285 | France | June 28, 1924 |